United States Patent
Andersson et al.

(10) Patent No.: US 8,295,323 B2
(45) Date of Patent: Oct. 23, 2012

(54) SYNCHRONIZATION FOR FREQUENCY HOPPING (FH) COMMUNICATION

(75) Inventors: Morgan Andersson, Romelanda (SE); Michael Numminen, Sävedalen (SE)

(73) Assignee: SAAB AB, Linköping (SE)

( * ) Notice: Subject to any disclaimer, the term of this patent is extended or adjusted under 35 U.S.C. 154(b) by 976 days.

(21) Appl. No.: 12/274,851

(22) Filed: Nov. 20, 2008

(65) Prior Publication Data

US 2009/0135887 A1    May 28, 2009

(30) Foreign Application Priority Data

Nov. 23, 2007   (EP) ..................... 07446008

(51) Int. Cl.
*H04B 1/00* (2006.01)
(52) U.S. Cl. ...................... 375/134; 375/137
(58) Field of Classification Search .................. 375/134, 375/137
See application file for complete search history.

(56) References Cited

U.S. PATENT DOCUMENTS

| 4,558,453 | A |   | 12/1985 | Mimken |        |
|-----------|---|---|---------|--------|--------|
| 5,737,372 | A | * | 4/1998  | Barham et al. | 375/145 |
| 6,163,548 | A | * | 12/2000 | Rainish et al. | 370/479 |
| 6,567,482 | B1 | * | 5/2003 | Popovic' | 375/343 |
| 2007/0104297 | A1 | * | 5/2007 | Gorday | 375/343 |

FOREIGN PATENT DOCUMENTS

| DE | 35 19 996 A1 | 2/1986 |
| DE | 3519996 A1 | 2/1986 |

OTHER PUBLICATIONS

European Search Report'Jun. 5, 2008.
Extended European Search Report, dated Jun. 5, 2008, issued in counterpart Application No. EP 07446008.0-2411.

* cited by examiner

*Primary Examiner* — Juan A Torres
(74) *Attorney, Agent, or Firm* — Venable LLP; Eric J. Franklin (57) ABSTRACT

A method for synchronization of transmitted and received signals in frequency hopping communications systems. A synchronization unit is arranged for synchronization of transmitted and received signals in frequency hopping communication systems and a frequency hopping communication system including a synchronization unit.

23 Claims, 5 Drawing Sheets

SYNCHRONIZATION FOR FREQUENCY HOPPING (FH) COMMUNICATION

CROSS-REFERENCE TO RELATED APPLICATIONS

This application claims priority to European patent application 07446008.0 filed 23 Nov. 2007.

TECHNICAL FIELD

The invention relates to the field of synchronization in frequency hopping (FH) communication systems.

BACKGROUND ART

Many communication systems of today use Frequency Hopping (FH) of a carrier wave in order to spread the frequency spectrum and make it look more like noise.

Information is transmitted by modulating a carrier wave. Modulation is defined as the process by which some characteristic of a carrier is varied in accordance with a modulating signal. In digital systems the modulating signal consists of a stream of binary data or an M-ary encoded version of it. The carrier is usually a sinusoidal signal. The carrier can be modulated by using Amplitude-shift keying (ASK), Frequency-shift keying (FSK) or Phase-shift keying (PSK) or combinations of these modulation principles as e.g. Quadrature Amplitude Modulation (QAM) or Orthogonal Frequency Division Multiplexing (OFDM). In this way a number of signals can be created at the carrier frequency. In the case of M-ary signalling a set of M signals are created where $M=2^m$ and m is the number of bits of source data that is transmitted at a time. Binary signalling is a special case where m=1 and thus M=2, i.e. one bit of source data is transmitted at a time using two signals. In the case of binary FSK two frequencies are used, one representing 0, also called the space frequency, and one representing 1, also called the mark frequency. If two bits are transmitted at the same time m=2 and M=4, i.e. 4 signals are generated. The two bits of source data transmitted at a time when m=2 is called a symbol and the symbol length here is two bits.

In frequency hopping (FH) systems the carrier frequency is changed, or hops, in accordance with a predefined frequency pattern. This pattern appears to change at random but is actually a pseudo random pattern generated by a pseudo random noise generator, called a PN-code generator. A common modulation type for FH systems is M-ary frequency-shift keying (MFSK). There are two types of Frequency Hopping:

Slow Frequency Hopping (SFH) where more than one symbol is transmitted within one frequency hop, which means that the symbol rate is an integer multiple of the hop rate, and Fast Frequency Hopping (FFH) where one symbol includes more than one frequency hop, which means that the hop rate is an integer multiple of the MFSK symbol rate.

In FH systems the spectrum of the transmitted signal is spread by the randomly hopping in frequency. The hopping frequency in FFH systems is higher than the symbol frequency and can also be higher than the bit frequency. The amount of spreading is proportional to the hopping frequency.

Normally the communication systems are of duplex type i.e. a two way communication with a transmitter and receiver at each end of the communication link. In order to synchronize transmitter and receiver the transmission is initially started at one single, predefined frequency. The receiver listens at this known frequency and when the predefined PN-code is detected by the receiver, synchronization is made and reception of data can start. The transmitter at the receiving end can also send an acknowledgement to the receiver at the transmitting end that synchronization has been made and that transmission of data can start. When the synchronization is established Frequency Hopping can also be started. The disadvantage with this solution is that it makes it relatively easy for a jammer to disturb the communication when the receiver is trying to establish synchronization by listening at one single frequency.

When FH communication takes place between two platforms moving in relation to each other there is a need for a frequent synchronization of transmitter and receiver. The situation becomes even more complicated when there is a one way communication and thus not possible to acknowledge to the transmitter that synchronization has been made.

There is thus a need for improved synchronization in FH communication systems not sensible to jamming and also suitable for one way communication.

SUMMARY OF THE INVENTION

The object of the invention is to remove the above mentioned deficiencies with prior art solutions and to provide:
- a method for synchronization of transmitted and received signals in Frequency Hopping (FH) communication systems
- a synchronization unit arranged for synchronization of transmitted and received signals in Frequency Hopping (FH) communication systems and
- a Frequency Hopping (FH) communication system comprising a synchronization unit to solve the problem of providing an improved synchronization in Frequency Hopping (FH) communication systems not sensible to jamming.

This object is achieved by providing a method for synchronization of transmitted and received signals in Frequency Hopping (FH) communication systems where data is transmitted in frames comprising a preamble and a data block. The FH communication system comprises a transmitter and a receiver, two PN-generators, one located at the transmitting end and one located at the receiving end, both generating the same predefined frequency pattern causing the transmitter and the receiver to hop in frequency according to the same pattern. The receiver and the PN-generator at the receiving end is part also of a synchronization unit wherein the clock rate in the receiver is slowed down compared to the clock rate of the transmitter, thus causing a characteristic pattern and a reversed characteristic pattern both patterns resulting from interference between the predefined frequency pattern ftx of the transmitted signal and the slowed down predefined frequency pattern frx used in the receiver. The slowed down predefined frequency pattern frx is controlled by the slower clock rate in the receiver and used in the receiver during synchronization. The time elapsed from start of synchronization represented by a starting point, the synchronization being initiated by a start sync signal, until obtaining the characteristic patterns is a measure of the delay between the transmitted and received signal which is used to synchronize the receiver to the transmitted signals.

The object is further achieved by providing a synchronization unit arranged for synchronization of transmitted and received signals in Frequency Hopping (FH) communication systems where data is arranged to be transmitted in frames comprising a preamble and a data block. The FH communication system comprises a transmitter and a receiver, two PN-generators, one located at the transmitting end and one located at the receiving end. Both PN-generators are arranged to generate the same predefined frequency pattern causing the transmitter and the receiver to hop in frequency according to the same pattern. The receiver and the PN-generator at the receiving end is part also of the synchronization unit wherein the clock rate in the receiver is arranged to be slowed down compared to the clock rate of the transmitter, thus causing a characteristic pattern and a reversed characteristic pattern. Both patterns resulting from interference between the predefined frequency pattern ftx of the transmitted signal and the slowed down predefined frequency pattern frx used in the receiver. The slowed down predefined frequency pattern frx is arranged to be controlled by the slower clock rate in the receiver and to be used in the receiver during synchronization. The time elapsed from start of synchronization represented by a starting point, the synchronization being arranged to be initiated by a start sync signal, until obtaining the characteristic patterns is a measure of the delay between the transmitted and received signal which is used to synchronize the receiver to the transmitted signals.

The object is further achieved by providing a Frequency Hopping (FH) communication system comprising a synchronization unit.

Frequency hopping is used during the whole of the synchronization phase. This gives the advantage that it very difficult to disturb or jam the communication and it will avoid non-authorized detection. A further advantage is that an acknowledgement of the completed synchronization is not needed to be returned to the transmitter. This makes the invention suitable for one way communication systems but it can also be used for two way or duplex communications. As the synchronization is fast and made continuously for each frame it is well suited for applications where the receiver is located on a fast moving vessel such as a missile or intelligent projectile. The invention is however not restricted to these applications but can also be used between stationary transmitters and receivers or any other applications where there is a relative motion between the transmitter and receiver as e.g. when the transmitter is moving and the receiver is fixed or when both the receiver and transmitter is moving.

Further advantages are achieved by implementing one or several of the features of embodiments which will be explained below.

DETAILED DESCRIPTION

The invention will now be described in detail with reference to the drawings.

The invention is intended for Frequency Hopping (FH) communication systems. Henceforth in the description the invention will be described in an embodiment having one frequency hop for each symbol and one bit per symbol which means that m=1 and M=2. Other embodiments with more or less than one frequency hop per symbol are also possible within the scope of the invention, i.e. the invention is applicable to both SFH and FFH communication systems.

The transmitter and the receiver are Frequency Hopping at each symbol according to a predefined frequency pattern. This pattern can e.g. be generated from a memory or from a Pseudo random Noise generator, PN-generator, synchronously clocked in both the transmitter and the receiver. This synchronization is made by introducing a difference in clock rates between the receiver and the transmitter and in this way introducing a "time sweep". In the receiver there will be a correlation between the predefined frequency pattern of the transmitted signal and the predefined frequency pattern used in the receiver at a certain time event. This correlation will be made in the receiver and the time event is used to calculate and adjust the time difference.

Figure 1:
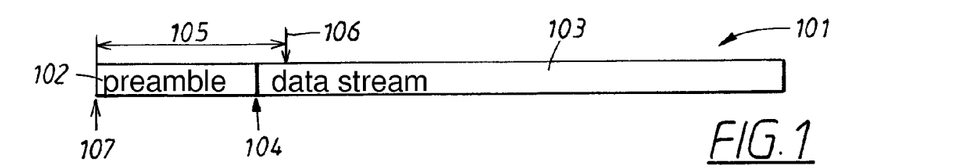
FIG. 1 schematically shows the structure of a frame.

The transmitted data is divided into frames as shown in FIG. 1. A frame 101 consists of a preamble 102 and a data stream 103. Transmission of data starts at a point 104. The preamble consists of a number of symbols where each symbol consists of one or several data bits each bit having the value 0 or 1. The preamble can also consist of any unique code using e.g. a combination of PSK, FSK, ASK, QAM or OFDM. The preamble is used to synchronize the transmitter with the receiver. The invention will be described in an embodiment with each symbol in the preamble consisting of one bit. However the invention is also applicable with the symbol of the preamble consisting of two or more bits. Reference numbers 105-107 are explained in association with FIG. 2.

Figure 2:
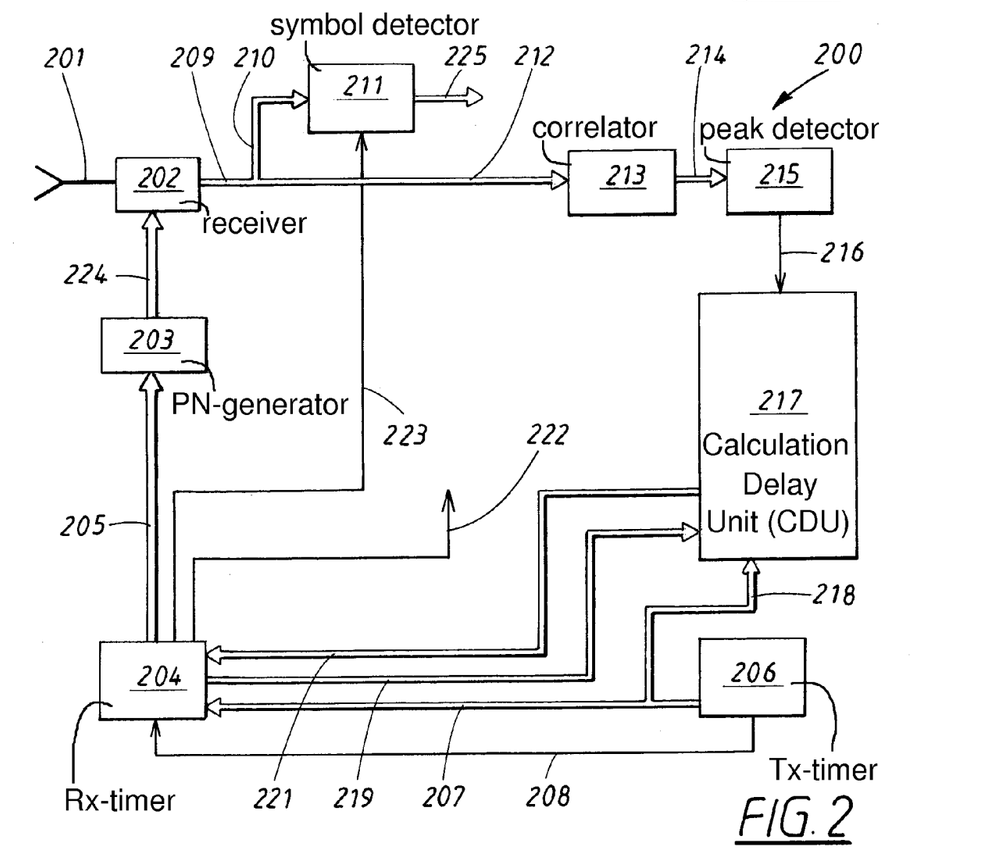
FIG. 2 shows a block diagram of the synchronization according to the invention.

FIG. 2 shows a block diagram of a synchronization unit 200 according to one embodiment of the invention. The broad arrows in FIG. 2 symbolize data buses transferring data words. A MFSK modulated FH signal 201, i.e. an analogue RF-signal (Radio Frequency), is received by a receiver 202. The invention can be implemented in applications with a stationary transmitter and receiver or in applications where the transmitter and receiver are moving in relation to each other. Henceforth in the description an application is described with a stationary transmitter and a receiver located on a platform that is rapidly moving away from the transmitter. The principle of the synchronization will however be the same for all applications mentioned.

The synchronization unit 200 in the embodiment shown in FIG. 2 comprises following main parts: the receiver 202, a PN-generator 203, an Rx-timer 204, a Tx-timer 206, a symbol detector 211, a correlator 213, a peak detector 215 and a Calculation Delay Unit (CDU) 217. These parts will be explained below.

Due to the continuously changing distance between the transmitter and the receiver, in the application with the receiver rapidly moving away from the transmitter, there will be a continuously changing time difference between the transmitted and received signal. In this embodiment with m=1 and M=2 it is a binary modulated FH signal with a frequency hop at each bit, i.e. the bit rate is the same as both the symbol rate and the hop rate. The PN-generator 203 is feeding the receiver with a data word 224 containing the predefined frequency pattern and thus determining the frequency in the receiver. This predefined frequency pattern, appearing to be a random pattern, is generated by the PN-generator. The predefined frequency pattern of the transmitted signal is generated by an identical PN-generator in the transmitter. The Rx-timer 204 sends one time stamp 205 for each symbol interval to the PN-generator 203. A time stamp is a consecutive number representing time with a resolution, in the described embodiment, corresponding to the length of one symbol. The time stamps are used by the PN-generator 203 as positions in the predefined frequency pattern and the PN-generator converts these time stamps to corresponding receiver frequencies which are transferred to the receiver via the data word 224. The time stamps thus define the positions in the predefined frequency pattern. A position corresponds to a symbol interval having a certain frequency. The Tx-timer 206 being identical to a Tx-timer in the transmitter communicates the Tx-time to the Rx-timer through a bus link 207. The Tx-timer is continuously adjusted against a certain reference such as e.g. a GPS (Global Positioning System) clock. The Tx-timer 206 generates a start sync signal 208 and a time setting on the bus link 207 every 100 ms which is equal to the frame interval. The time setting synchronizes the time in the Rx-timer 204 with the time in the Tx-timer 206 at each start sync signal 208. The start sync signal 208 initiates a clock rate in the Rx-timer to slow down, compared to a clock rate used in the Tx-timer, causing the rate of the time stamps 205 to decrease and the predefined frequency pattern used in the receiver to be generated at a slower speed during synchronization. The rate of the time stamps 205 thus decides the speed of the predefined frequency pattern used in the receiver.

In the receiver the frequency hopping of the signal 201 is removed by letting, the receiver frequency hop according to the predefined frequency pattern transferred through the data word 224 from the PN-generator 203 after which an analog-to-digital (A/D) conversion is performed. These are well known techniques to the skilled person and not further described here.

Figure 2A:
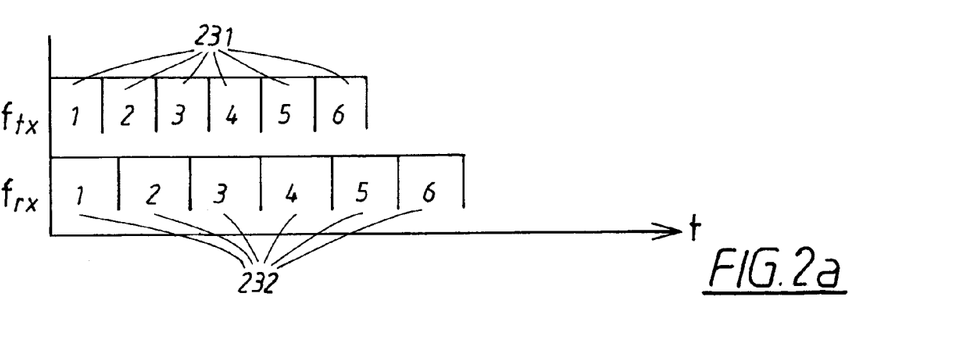
FIG. 2a schematically shows the predefined frequency patterns of the transmitted signal and the predefined frequency pattern used in the receiver during synchronization.

In FIG. 2a the predefined frequency pattern with the speed of the transmitted signal is designated ftx and the predefined frequency pattern with the slower speed used in the receiver during synchronization is designated frx. The ftx-intervals 231 and frx-intervals 232 are symbol intervals. The first six intervals designated with 1-6 are shown in FIG. 2a. In the described embodiment 35 symbols are used in the preamble; however any number of symbols can be used as long as the length of the preamble is long enough to allow time for synchronization. During a symbol interval a symbol is transmitted or received at a certain frequency. The frequency is changed at each symbol interval when the symbol rate is the same as the frequency hop rate as is the case in this embodiment. In other embodiments of the invention, the hop rate can however be higher or lower than the symbol rate. As can be seen in FIG. 2a the frx symbol intervals are longer than the ftx symbol intervals which is due to the fact that the Rx timer 204 is slowed down, compared to the Tx-timer, during the synchronization period. When there is a correlation between the ftx and the frx predefined frequency patterns, i.e. when the two predefined frequency patterns have the same frequency at the same time the receiver will be able to receive the transmitted signal and the output signal 209 will include the received signal as will be explained further in association with FIG. 3. As the frx has a slower speed than the ftx a "time sweep" will be created. At a certain time the predefined frequency pattern of the transmitter will catch up with the predefined frequency pattern of the receiver.

The output signal 209 of the receiver which now is "dehopped" and divided in two paths, a first path 210 to the symbol detector 211 and a second path 212 to the correlator 213. The output signal 209, which is a so called white noise signal, includes the input signal 201 after the A/D conversion, during the intervals when the predefined frequency patterns ftx and frx have the same frequency at the same time. The sample rate, due to the A/D conversion, is considerably higher than the symbol rate of the received signal.

In the symbol detector 211 the sampling rate is first decimated to a rate being four times that of the received symbol rate, which means that there are four samples for each symbol in this embodiment of the invention. Any other numbers of samples per symbols, or sample rate, is also possible within the scope of the invention. For practical reasons the sample rate is normally in the interval 4-16 samples per symbol. The symbol detector does a symbol filtering and reads the symbols, now with the same sample rate as the symbol rate in the received signal, by using a symbol clock signal 223. The symbol clock signal 223 is generated by the Rx-timer 204 and defines the sampling positions. When the system is synchronized the phase of the symbol clock signal 223 matches optimal sampling position for each symbol. The synchronization will be described in connection with the CDU and a data start signal 222 below. The symbol detector comprises as many correlators as there are M-ary signals, which in this example means that there are two correlators, one for each M-ary signal. The output from the symbol detector is a data signal 225 with the same sample rate as the rate of the time stamps from the Rx-timer 204.

The output signal 209 from the second path 212 is fed into the correlator 213 and correlated with a characteristic pattern and a reversed characteristic pattern that results from interference between the predefined frequency pattern of the transmitted signal and the predefined frequency pattern used in the receiver during the synchronization. The frequency pattern in the receiver is the same as the predefined frequency pattern of the transmitter, but generated at a slower speed. The characteristic pattern and the reversed characteristic pattern are stored in the correlator. The generation of the characteristic patterns is explained further in association with FIG. 3 where these patterns are designated 304 and 312. In the correlator 213 the sampling rate is first decimated to a rate being four times that of the received symbol rate, which means that in this example there are four samples for each symbol. This decimation of the sample rate can also be performed in the receiver 202. In that case it is not necessary with a decimation procedure neither in the correlator nor in the symbol detector 211. The correlator 213 gives an out signal 214 only when there is a correlation between the output signal 209 in the second path 212 and the characteristic patterns. The maximum of the out signal 214 is detected in the peak detector 215. The peak detector 215 can e.g. derive the out signal 214 and when the differential coefficient has a zero crossing, maximum is detected and a trigger signal 216 is sent to the Calculation Delay Unit (CDU) 217.

FIG. 2a illustrates the situation when there is no delay between the ftx and the frx predefined frequency patterns. The situation with different delays will be illustrated in FIG. 3b and FIG. 3c.

The CDU receives a Tx-time 218 from the Tx-timer and an Rx-time 219 from the slowed down clock in the Rx-timer. When the CDU receives the trigger signal 216 it calculates a delay from generation of the start sync signal 208 until reception of the trigger signal 216. This delay corresponds to the delay between the transmitted and the received signal and will be proportional to the distance between the transmitter and the receiver. The longer the distance the bigger the time difference will be between the transmitted and received signal and the longer it will take the predefined frequency pattern of the transmitter to catch up with the predetermined frequency pattern used in the receiver during synchronization. The CDU sends an offset value 221 to the Rx-timer 204 informing the Rx-timer of the delay and at the same time trigger the Rx-timer 204 to change clock rate to the clock rate of the Tx-timer 206. The Rx-timer will then have the correct time compensated for the delay and run at the same clock rate as the Tx-timer 206. By doing this the predefined frequency pattern generated by the PN-generator 203 will now be synchronized to the received predefined frequency pattern from the transmitter, i.e. the predefined frequency pattern of the receiver will now be in phase with the predefined frequency pattern of the transmitter and run at the same speeds. The Rx-timer now initiates a data start signal 222 informing the FH communication system that valid data now can be received. At the same time the Rx-timer sends a symbol clock signal 223 to the symbol detector 211 to define a sample position of a symbol. The data start signal 222 coincides with the sampling position 106 (see FIG. 1) of the first data symbol. This occurs at a fixed time 105 (see FIG. 1) from a frame starting point 107 (see FIG. 1) initiated by the start sync signal 208. The symbol clock signal 223 will now have the right phase and the optimal sampling point on the symbol is achieved. When the data start signal 222 is received by the FH communication system, the FH communication system reads one data block 103 from the data signal 225. In this embodiment the frame interval is 100 ms of which the preamble interval is a few ms. The synchronization is made during the preamble interval. When a data block 103 is read a new start sync signal 208 is generated from the Tx-timer 206 and the synchronization process starts all over again.

Figure 3:
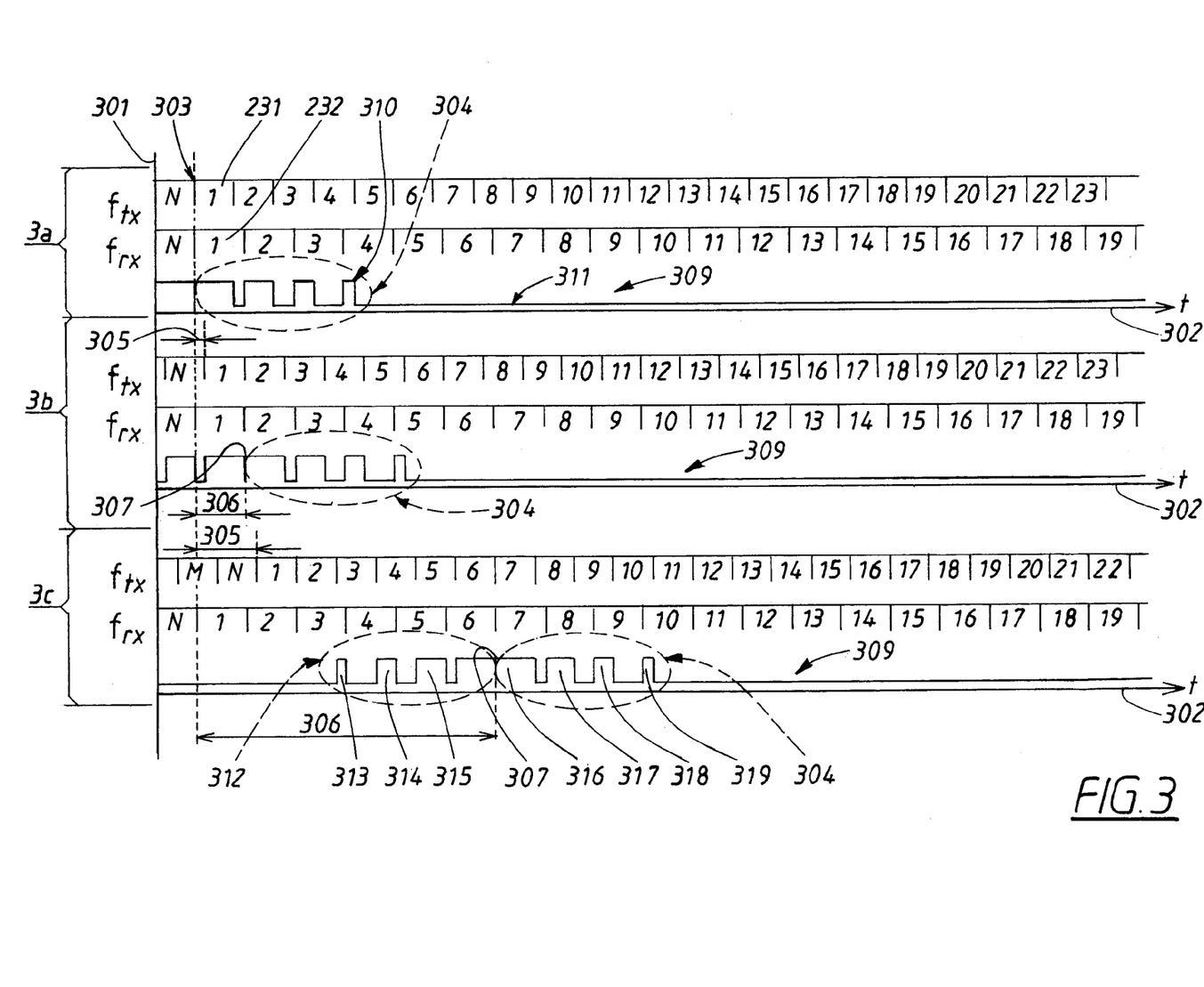
FIGS. 3a-3c schematically shows graphical evaluation for three different distances according to the invention, using nano-scale effect.

FIG. 3 illustrates the interference between the predefined frequency patterns of the transmitter and the predefined frequency pattern used in the receiver during synchronization for different distances between the transmitter and the receiver. The ftx and the frx on the vertical axis 301 of FIG. 3 have the same meaning as explained in connection with FIG. 2. The horizontal axis 302 represents time t and a starting point 303 on the horizontal axis represents the starting point of a frame in the receiver and the start of the start sync signal 208. A new starting point 303 is generated every 100 ms from the Tx-timer. The N and M intervals in FIG. 3 are parts of the data block 103 of an earlier frame. FIG. 3a corresponds to the situation when the receiver and transmitter are located at the same position. An interference pattern is generated between the predefined frequency pattern of the transmitter, ftx, and the predefined frequency pattern used in the receiver during synchronization, frx, running at a slower speed and when the two predefined frequency patterns have the same frequency at the same time the receiver will be able to receive the transmitted signal and the output signal 209 from the receiver 202 will include the received signal. The periods when the frx and the ftx have the same frequency is illustrated in FIG. 3a as an interference pattern 309 having a high value 310 when the ftx and frx have the same frequency and a low value 311 when their frequencies differ. FIG. 3a illustrates the interference pattern 309 when the ftx and the frx predefined frequency patterns are started from the same starting point 301, i.e. the delay is zero. A characteristic pattern 304 is generated as shown in the figure. As mentioned above the frx comprises the predefined frequency pattern used in the receiver during synchronization. The ftx is the predefined frequency pattern used in the transmitter.

FIG. 3b illustrates the situation when the distance between the receiver and the transmitter corresponds to one sample delay. The delay can also be a part of one sample. The predefined frequency pattern ftx of the transmitted signal is received in the receiver 202 with a first delay 305 proportional to the distance between the receiver and transmitter. The delay is here illustrated as one sample, which in this embodiment corresponds to a quarter of the length of a symbol. The characteristic pattern 304, obtained from interference between the ftx and the frx predefined frequency patterns can be seen to start at a synchronization point 307 in the interference pattern 309 after a second delay 306 of 5 samples. Due to the so called nano-scale effect the second delay will be magnified with a factor F. F is equal to the number of samples for a symbol +1. In this example F=4+1. The first delay is 1 sample and the second delay 306 thus becomes 5*1=5 samples. At the synchronization point 307 the predefined frequency pattern of the transmitter ftx has caught up with the predefined frequency pattern frx used in the receiver during synchronization and synchronization is accomplished. The nano-scale effect is also mathematically explained in association with FIG. 6.

FIG. 3c shows an example where the first delay 305 is 6 samples. The second delay 306 thus becomes 6*5=30 samples due to the nano-scale effect. In this case the synchronization point 307 will thus be reached after 30 samples. This magnification effect has the advantage of making it easier to detect the synchronization point with good accuracy which is important for the sampling position of the symbol and the symbol clock signal 223.

When the sampling period is 25 μs a delay of one sample corresponds to a distance of 7500 m.

The characteristic pattern 304 of the interference pattern 309 is shown also in FIGS. 3b and 3c. In FIG. 3c the interference pattern 309 also includes a reversed characteristic pattern 312. The combined reversed characteristic pattern and the characteristic pattern have successive peaks 313-316 becoming successively broader followed by peaks 317-319 becoming successively narrower. The reversed characteristic pattern 312 represents the situation when the ftx predefined frequency pattern is closing up on the frx predefined frequency pattern and the characteristic pattern 304 represents the situation when the ftx predefined frequency pattern moves away from the predefined frequency pattern frx. This is further explained in association with FIG. 7. The time elapsed from start of synchronization represented by the starting point 303, the synchronization being initiated by the start sync signal 208, until obtaining the characteristic patterns is a measure of the delay between the transmitted and received signal and this is thus used to synchronize the receiver to the transmitted signals.

In order to receive the complete reversed characteristic pattern also in the examples illustrated in FIGS. 3a and 3b a fictitious distance corresponding to a certain delay of the transmitted signal can be introduced in the receiver.

The invention is also, as mentioned above, applicable for other sample rates. With 8 samples per symbol and a first delay of 5 samples, the second delay will be 5×(8+1)=45 samples.

As explained above frequency hopping is used during the whole of the synchronization phase. This makes it very difficult to disturb or jam the communication. Non authorized detection can also be avoided. A further advantage is that an acknowledgement of the completed synchronization is not needed to be returned to the transmitter. This makes the invention suitable for one way communication systems but it can also be used for two way or duplex communications. As the synchronization is fast and made continuously for each frame it is well suited for applications where the receiver is located on a fast moving vessel such as a missile or intelligent projectile. The invention is however not restricted to these applications but can also be used between stationary transmitters and receivers or any other applications where there is a relative motion between the transmitter and receiver as e.g. when the transmitter is moving and the receiver is fixed or when both the receiver and transmitter is moving.

Figure 4:
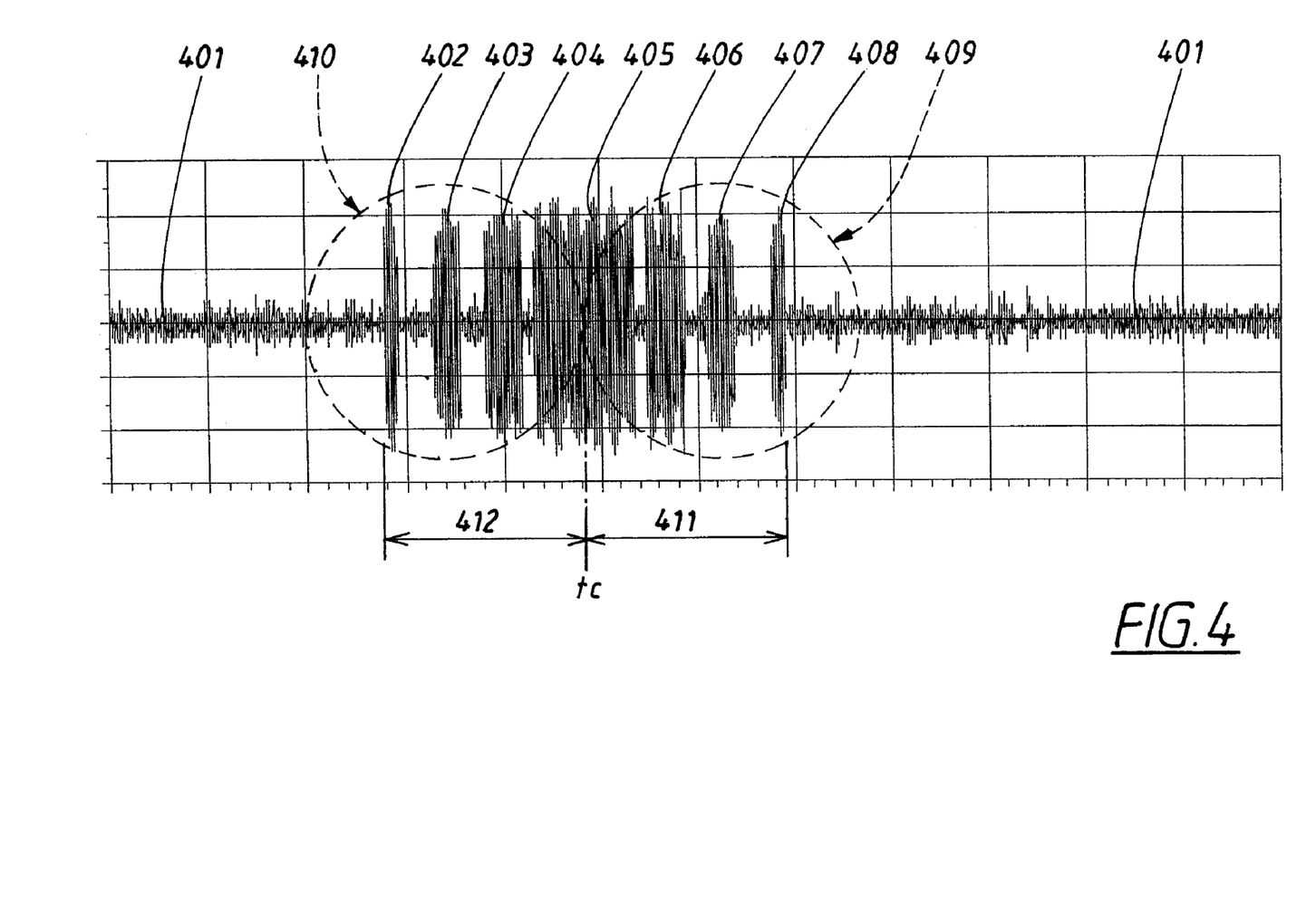
FIG. 4 shows an example of an output signal from the receiver according to the invention.

The output signal 209 is a so called white noise signal, including the input signal 201 after the A/D conversion. FIG. 4 illustrates an example of the output signal 209 with the white noise 401. The characteristic patterns 304 and 312 can here be recognized in patterns 409 and 410 with the only difference that in FIG. 4 the high value 310 corresponds to a signal in pulses 402-408 and the low value 311 corresponds to no signal or white noise 401. The peaks 313-319 can also be seen as the pulses 402-408 in FIG. 4. In the pulse intervals the predefined frequency patterns ftx and frx have the same frequency and the transmitted data signal is received during these intervals. The centre of the combined patterns 409 and 410 is designated tc in FIG. 4 and is the end point of the reversed characteristic pattern 410 and the starting point of the characteristic pattern 409. The time tc corresponds to the synchronization point 307 of FIG. 3. The first time width 411 of the characteristic pattern 409 is the same as the second time width 412 of the reversed characteristic pattern. The first and second time widths are fixed, each one equal to 4 transmitter symbol lengths in the described example. A characteristic pattern and a reversed characteristic pattern is always generated but will be different for different embodiments of the invention depending on selected rate of frequency hopping and selected difference between the speeds of the ftx and the frx predefined frequency patterns.

Figures 5, 5A, 5B:
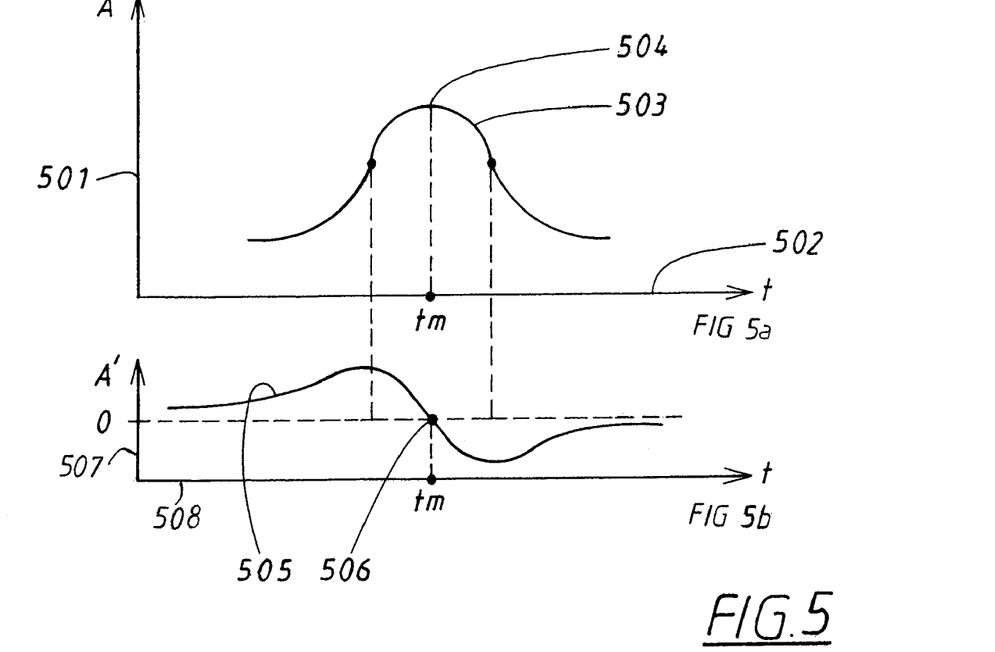
FIGS. 5a and 5b schematically shows the principle of peak detection.

The out signal 214 from the correlator is, as mentioned earlier, fed to the peak detector 215. FIG. 5a schematically illustrates the out signal 214 fed into the peak detector as a function of time. The amplitude A of the out signal 214 from the correlator is depicted on the vertical axis 501 and time on the horizontal axis 502. Curve 503 schematically represents the amplitude and will have a maximum point 504 at a time tm. This maximum point will appear when the combined characteristic pattern 409 and the reversed characteristic pattern 410, matches the pattern stored in the correlator. In FIG. 5b the derived amplitude A' is shown on the vertical axis 507 and time on the horizontal axis 508. In the peak detector 215 the amplitude curve 503 will be derived and the derived curve A' 505 in FIG. 5b will have a zero crossing at a point 506 at the time tm. This peak detection is accomplished by means well known to the skilled person. As explained above the time tm will be reached when the combined characteristic patterns 409 and 410 are matched to the pattern stored in the correlator. When the zero crossing of A' is detected the trigger signal 216 is sent to the CDU, 217. The CDU calculates the synchronization time tc, corresponding to the synchronization point 307, by offsetting the time tm with approximately the first time width 411 of the characteristic pattern. The exact calculation of this tm offset is further described in association with FIG. 6 below. The length of the preamble is chosen such that there will be sufficient time during the preamble to perform the offset and initiate the synchronization before the data block 103 in the frame 101 is reached. The steps thereafter in the synchronization process have been described above.

Figure 6:
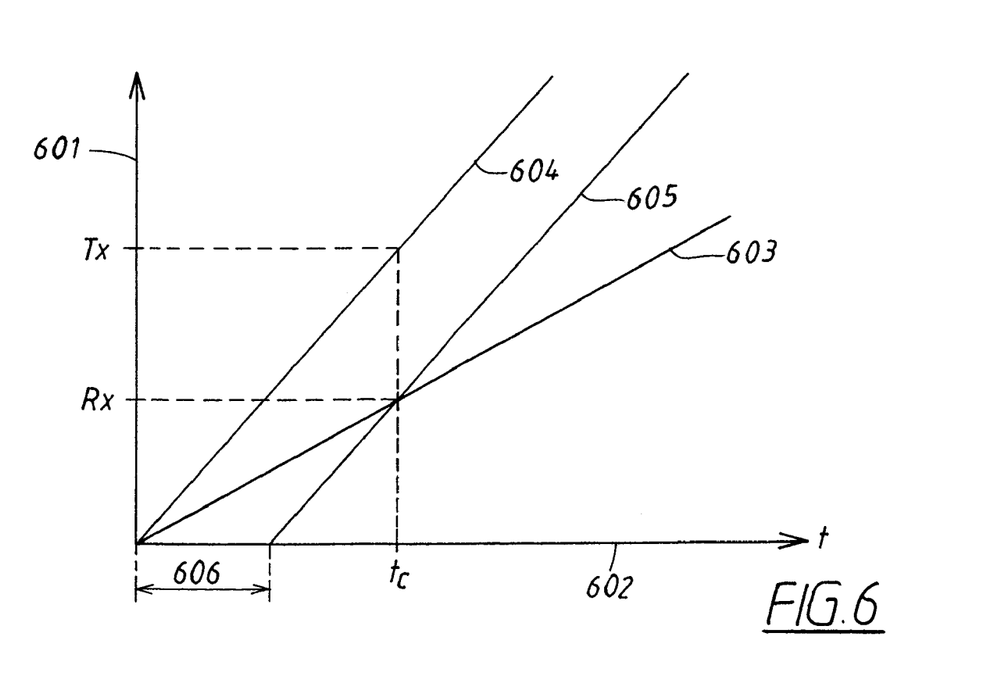
FIG. 6 schematically illustrates Tx- and Rx-timer relations according to the invention.

FIG. 6 schematically illustrates the relations between the different timers and the calculation of the tm offset value. In FIG. 6 the Tx-timer and Rx-timer values are depicted on the vertical axis 601 and time on the horizontal axis 602. Line 603 represents the Rx-timer 204 during synchronization, line 604 the Tx-timer 206 at the receiving end and line 605 represents the Tx-timer in the transmitter seen from the receiver. The time interval marked 606 represents a time Δt for the transmitted signal to reach the receiver. In the formulas below $T_{TX}$ represents the time value for the Tx-timers and $T_{RX}$ represents the time value for the Rx-timer.

The lines in FIG. 6 correspond to the following equations:
Rx-timer, line 603

$$T_{RX}(t) = k_{RX} \cdot t \quad (1)$$

Tx-timer in receiver and transmitter, line 604

$$T_{TX}(t) = k_{TX} \cdot t \quad (2)$$

Tx-timer in transmitter seen from the receiver, line 605

$$T_{TX}(t-\Delta t) = k_{TX} \cdot (t-\Delta t) \quad (3)$$

Where $$k_{TX} > k_{RX} > 0 \quad (4)$$

Intercept between the delayed predefined frequency pattern of the transmitter ftx and the predefined frequency pattern frx used in the receiver during synchronization occur at the time $t_C$ when $$T_{TX}(t_C - \Delta t) = T_{RX}(t_C) \quad (5)$$

Rx in FIG. 6 is the timer value of the Rx-timer 204 at the time $t_C$ and Tx in FIG. 6 is the timer value of the Tx-timer 206 at the time $t_C$.

In order to be synchronized the Rx-timer 204 shall count like the Tx-timer 206 adjusted with a value $T_{ADJ}$ according to $$T_{RX}(t) = T_{TX}(t) - T_{ADJ} = T_{TX}(t-\Delta t) \quad (6)$$

This equation together with equation (4) gives $$T_{ADJ} = T_{TX}(t_C) - T_{RX}(t_C) \quad (7)$$

This means that the Rx-timer 204 at the receiving end shall be adjusted to a value corresponding to the actual Tx-timer value minus the difference between the Tx-timer and the Rx-timer values at the time $t_C$.

Because of the fact that the out signal 214 from the correlator will give a peak first at time $t_m$ when the interference pattern 309 between the predefined frequency pattern of the transmitter ftx and the predefined frequency pattern frx used in the receiver during synchronization is correlated with the combined characteristic pattern 409 and the reversed characteristic pattern 410 stored in the correlator. The correlation will occur a certain time offset $t_k$ after the time $t_C$. according to equation (8).

$$t_m = t_C + t_k \quad (8)$$

Where the time offset $t_k$ depends on the length of the interference pattern and ideally is half the length, i.e. the time width 411 or 412. In practice there will be a difference due to weighting of the correlator coefficients and also processing time can be included.

From equations (1), (2) and (8) follows:

$$T_{RX}(t_m) = T_{RX}(t_C) + k_{RX} \cdot t_k \quad (9)$$

$$T_{TX}(t_m) = T_{TX}(t_C) + k_{TX} \cdot t_k \quad (10)$$

From equations (9) and (10) follows that equation (7) can be written as:

$$T_{ADJ} = T_{TX}(t_m) - T_{RX}(t_m) - k_D \quad (11)$$

Where a constant $k_D$ is introduced being a design parameter defined according to:

$$k_D = k_{TX} \cdot t_k - k_{RX} \cdot t_k \quad (12)$$

The nano-scale effect, mentioned above in association with FIG. 3b, can also be further explained mathematically from the equations above. From equations (1), (3) and (5) follows:

$$k_{TX} \cdot \Delta t = k_{TX} \cdot t_C - k_{RX} \cdot t_C \quad (13)$$

and $$t_C = \frac{k_{TX}}{k_{TX} - k_{RX}} \cdot \Delta t \quad (14)$$

With requirements according to equation (4) this means a scale effect of time because $$\frac{k_{TX}}{k_{TX} - k_{RX}} > 1$$

For example if $$k_{TX} = \frac{1}{4} \text{ and } k_{RX} = \frac{1}{5}$$

which is the case when one symbol interval is 4 samples in the transmitter and 5 samples in the receiver (due to the slower clock rate in the receiver during synchronization) then:

$$\frac{k_{TX}}{k_{TX} - k_{RX}} = 5$$

Figures 7A, 7B:
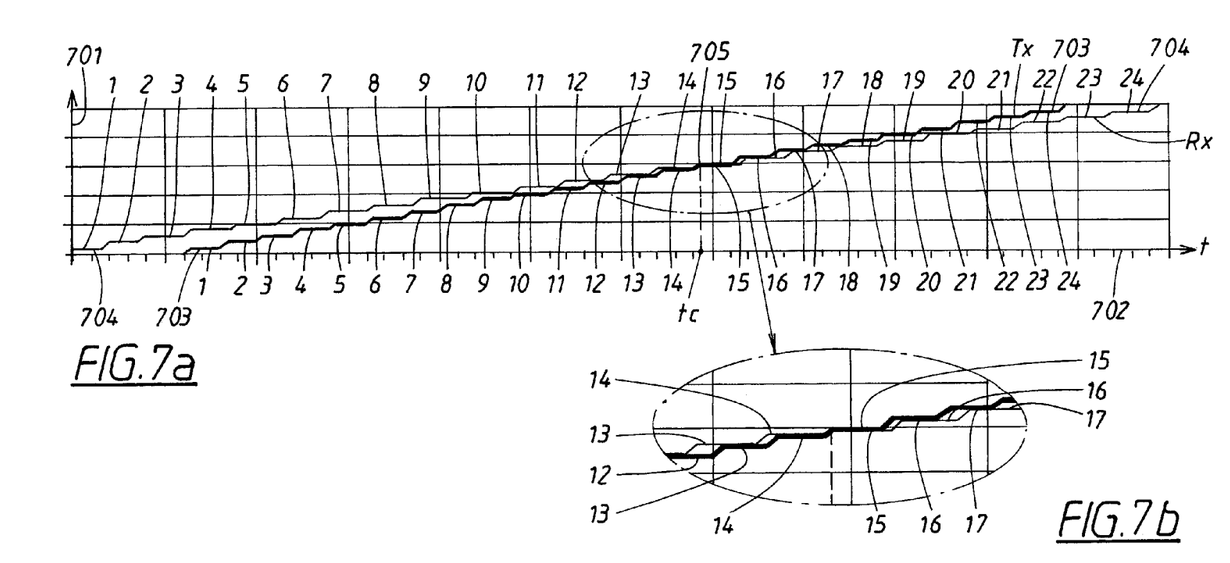
FIGS. 7a-7c schematically shows the principle of creating the time sweep of the invention.

FIG. 7a further illustrates "the time sweep", or how the predefined frequency pattern of the transmitted signal catches up with the predefined frequency pattern used in the receiver during synchronization. The vertical axis 701 represents positions in frequency pattern and the horizontal axis 702 represents time t. Curve Tx 703 represents the positions in the predefined frequency pattern for the transmitted signal ftx as a function of time. Each position in the predefined frequency pattern corresponds to a symbol interval 231 in the described embodiment, when the symbol rate is equal to the frequency hopping rate. Each step in the curve 703 represents a frequency position and a symbol interval. A total of 24 steps are marked.

Curve Rx 704 represents the positions, defined by the time stamps 205, in the predefined frequency pattern used in the receiver during synchronization as a function of time. Each position in the predefined frequency pattern corresponds to a symbol interval 232 in the described embodiment, when the symbol rate is equal to the frequency hopping rate. Each step in the curve 704 represents a frequency position and a symbol interval. A total of 24 steps are marked in FIG. 7a.

Steps with the same number in the Tx and Rx curve have the same frequency. The frequency is changed at each step as the frequency hopping rate is the same as the symbol rate in this embodiment. Each step in the Tx curve is shorter in time than the steps in the Rx curve due to the slowing down of the Rx clock during the synchronization phase. As can be seen in FIG. 7a steps on the Tx and Rx curve having the same step number, and thus the same frequency, are coming closer and closer as time lapse. In the close up shown in FIG. 7b it can be seen that steps 15 of the Tx and Rx curve will have a complete overlap at a cross point 705, at the time tc. At this point the predefined frequency pattern of the transmitted signal has caught up with the predefined frequency pattern used in the receiver and the synchronization point 307 of FIGS. 3b and 3c is reached.

Figure 7C:
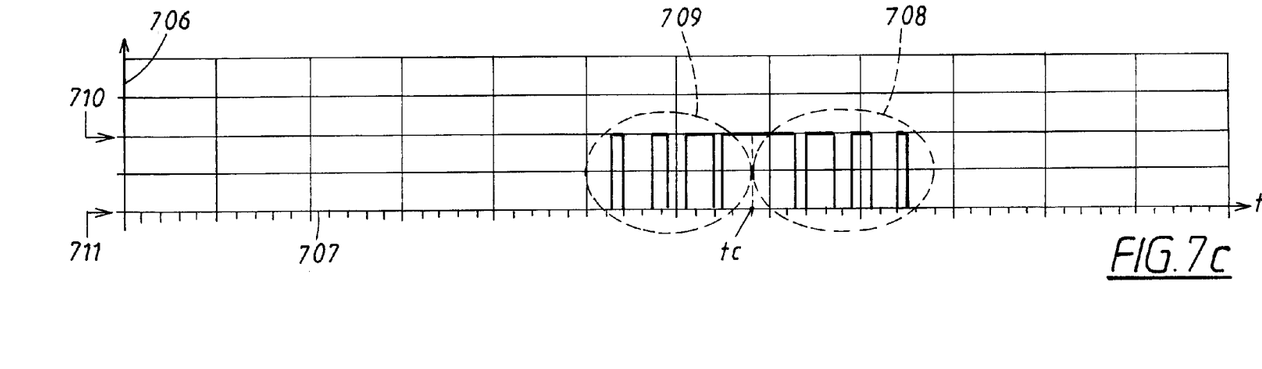

FIG. 7c shows the interference pattern 309 as a function of time, with time on the horizontal axis 707, where a high level 710 on the vertical axis 706 means ftx=frx and a low level 711 on the vertical axis means ftx≠frx. As explained in association with FIG. 3 there will be an output signal 209 from the receiver containing the received signal when the ftx and the frx predefined frequency patterns have the same frequency at the same time, or as illustrated in FIG. 7, when the Tx and Rx curve have the same step number at the same time. When the steps are deviating after the time tc the characteristic pattern 708 is created corresponding to the characteristic pattern 304 of FIG. 3. The reversed characteristic pattern 709 is created when the steps are approaching. This reversed characteristic pattern 312 can also be seen in FIG. 3c.

The invention is not limited to the embodiments above, but may vary freely within the scope of the appended claims.

The invention claimed is:

1. A method for synchronization of transmitted and received signals in frequency hopping communication systems where data is transmitted in frames comprising a preamble and a data block, the frequency hopping communication system comprising a transmitter and a receiver, two PN-generators, one located at a transmitting end and one located at a receiving end, both generating a same predefined frequency pattern causing the transmitter and the receiver to hop in frequency according to the same predefined frequency pattern, the receiver and the PN-generator at the receiving end also being part of a synchronization unit, the method comprising:

slowing a clock rate in the receiver with respect to a clock rate of the transmitter, thus causing
an interference pattern comprising a characteristic pattern and a reversed characteristic pattern, wherein the characteristic pattern and the reversed characteristic pattern result from interference between the predefined frequency pattern of the transmitted signal and a slowed down predefined frequency pattern used in the receiver, the slowed down predefined frequency pattern being controlled by the slower clock rate in the receiver and used in the receiver during synchronization, and
a measure of a delay between the transmitted data and received signals being defined as a time elapsed from start of synchronization represented by a starting point, the synchronization being initiated by a start sync signal, until obtaining the characteristic patterns being a measure of the delay between the transmitted data and received signals which is used to synchronize the receiver to the transmitted signals; and
receiving the predefined frequency pattern of the transmitted signal in the receiver with a first delay proportional to a distance between the receiver and transmitter, wherein the characteristic pattern starts at a synchronization point in the interference pattern at the time tc after a second delay, wherein a Vernier scale effect causes the second delay, and wherein the second delay is a measure of the delay between the transmitted and received signal, to be magnified compared to the first delay.

2. The method for synchronization according to claim 1, wherein the frequency hopping communication system uses one bit per symbol and wherein a frequency hop is made at each bit.

3. The method for synchronization according to claim 1, wherein more than one frequency hop is performed at each bit.

4. The method for synchronization according to claim 1, wherein the transmitter is stationary and wherein the receiver is moving away from the transmitter.

5. The method for synchronization according to claim 1, wherein both the transmitter and the receiver are stationary.

6. The method for synchronization according to claim 1, further comprising:
sending, with an Rx-timer in the synchronization unit, time stamps deciding the speed of the predefined frequency pattern generated by the PN-generator and used in the receiver during synchronization and defining positions in the predefined frequency pattern,
communicating, with a Tx-timer in the synchronization unit being identical to a Tx-timer in the transmitter, a Tx-time to the Rx-timer through a bus link at start of the start sync signal,
continuously adjusting the Tx-timer against a reference,
generating, with the Tx-timer, the start sync signal to the Rx-timer at regular intervals equal to a frame interval, and
initiating, with the start sync signal, a clock rate in the Rx-timer to slow down causing a rate of the time stamps to decrease and the predefined frequency pattern used in the receiver during synchronization to be generated at a slower speed.

7. The method for synchronization according to claim 1, wherein an interference pattern is generated by interference between the predefined frequency pattern of the transmitter, and the predefined frequency pattern used in the receiver during synchronization and running at a slower speed, and wherein when the two predefined frequency patterns have the same frequency at the same time, the characteristic patterns will be generated and the receiver will be able to receive the transmitted signal and the output signal from the receiver will include the received signal.

8. The method for synchronization according to claim 1, further comprising:
feeding the output signal to a symbol detector through a first path and a correlator through a second path, both being located in the synchronization unit,
correlating the output signal in the correlator with the characteristic pattern,
storing the reversed characteristic pattern in the correlator, and
generating, with the correlator, an out signal when there is a correlation between the output signal and the characteristic patterns stored in the correlator.

9. The method for synchronization according to claim 1, further comprising:
detecting, in a peak detector, the maximum of the out signal, and
generating, with the peak detector, a trigger signal to a calculation delay unit, wherein the peak detector and the calculation delay unit are located in the synchronization unit.

10. The method for synchronization according to claim 9, further comprising:
receiving information with the calculation delay unit, the information including:
a trigger signal,
a Tx-time from the Tx-timer,
an Rx-time from the Rx-timer,
calculating, with the calculation delay unit, based on the received information
a delay from the start sync signal to reception of the trigger signal corresponding to the delay between the transmitted and received signal, and
sending, with the calculation delay unit, an offset value to the Rx-timer informing the Rx-timer of the delay and at the same time, trigger the Rx-timer to change the clock rate to the clock rate of the Tx-timer.

11. The method for synchronization according to claim 10, wherein the Rx-timer after having received the offset value:
initiates a data start signal informing the frequency hopping communication system that valid data now can be received, and
sends a symbol clock signal to the symbol detector to define a sample position of a symbol.

12. A synchronization unit arranged for synchronization of transmitted and received signals in frequency hopping communication systems where data is arranged to be transmitted in frames comprising a preamble and a data block, the frequency hopping communication system, the synchronization unit comprising:
a transmitter,
a receiver, and
two PN-generators, one located at a transmitting end and one located at a receiving end, both PN-generators arranged to generate a same predefined frequency pattern causing the transmitter and the receiver to hop in frequency according to the same pattern, the receiver and the PN-generator at the receiving end being part also of the synchronization unit, wherein a clock rate in the receiver is arranged to be slowed down compared to a clock rate of the transmitter, thus causing a characteristic pattern and a reversed characteristic pattern, wherein the characteristic pattern and the reversed characteristic pattern result from interference between the predefined frequency pattern of the transmitted signal and the slowed down predefined frequency pattern used in the receiver, the slowed down predefined frequency pattern arranged to be controlled by the a slower clock rate in the receiver and to be used in the receiver during synchronization, the time elapsed from start of synchronization represented by a starting point, the synchronization being arranged to be initiated by a start sync signal, until obtaining the characteristic pattern and the reversed characteristic pattern being a measure of the delay between the transmitted and received signal which is used to synchronize the receiver to the transmitted signals, wherein the predefined frequency pattern of the transmitted signal is arranged to be received in the receiver with a first delay proportional to a distance between the receiver and transmitter, wherein the characteristic pattern is arranged to start at a synchronization point in the interference pattern at a time tc after a second delay, and wherein a Vernier scale effect causes the second delay, the second delay being a measure of the delay between the transmitted and received signal, to be magnified compared to the first delay.

13. The synchronization unit according to claim 12, wherein the frequency hopping communication system is arranged to use one bit per symbol and that a frequency hop is made at each bit.

14. The synchronization unit arranged for synchronization according to claim 12, wherein the frequency hopping communication system is arranged to perform more than one frequency hop at each bit.

15. The synchronization unit according to claim 12, wherein the transmitter is stationary and wherein the receiver is arranged to be moved away from the transmitter.

16. The synchronization unit according to claim 12, wherein both the transmitter and the receiver are arranged to be stationary.

17. The synchronization unit according to claim 12, wherein:
- an Rx-timer in the synchronization unit arranged to send time stamps deciding the speed of the predefined frequency pattern generated by the PN-generator and used in the receiver during synchronization and defining the positions in the predefined frequency pattern,
- a Tx-timer in the synchronization unit being identical to a Tx-timer in the transmitter arranged to communicate a Tx-time to the Rx-timer through a bus link at start of the start sync signal,
- the Tx-timer arranged to be continuously adjusted against a reference,
- the Tx-timer arranged to generate the start sync signal to the Rx-timer at regular intervals equal to a frame interval, and
- the start sync signal arranged to initiate a clock rate in the Rx-timer to slow down causing a rate of the time stamps to decrease and the predefined frequency pattern used in the receiver during synchronization to be generated at a slower speed.

18. The synchronization unit according to claim 12, wherein the predefined frequency pattern of the transmitter, and the predefined frequency pattern running at a slower speed and used in the receiver during synchronization are arranged to generate an interference pattern and when the two predefined frequency patterns have the same frequency at the same time the receiver is arranged to receive the transmitted signal and the output signal from the receiver will include the received signal.

19. The synchronization unit according to claim 12, wherein the output signal is arranged to be fed to a symbol detector through a first path and a correlator through a second path, both being located in the synchronization unit, the output signal being arranged to be correlated in the correlator with the characteristic pattern and the reversed characteristic pattern arranged to be stored in the correlator and the correlator is arranged to generate an out signal when there is a correlation between the output signal and the characteristic patterns stored in the correlator.

20. The synchronization unit according to claim 12, wherein the maximum of the out signal is arranged to be detected in a peak detector which is arranged to generate a trigger signal to a calculation delay unit the peak detector and the calculation delay unit both being located in the synchronization unit.

21. The synchronization unit according to claim 20, wherein the calculation delay unit is arranged to receive:
- a trigger signal,
- a Tx-time from the Tx-timer,
- an Rx-time from the Rx-timer,
- based on this information the calculation delay unit is arranged to:
  - calculate a delay from the start sync signal to reception of the trigger signal corresponding to the delay between the transmitted and received signal and
  - send an offset value to the Rx-timer informing the Rx-timer of the delay and at the same time trigger the Rx-timer to change the clock rate to the clock rate of the Tx-timer.

22. The synchronization unit according to claim 21, wherein the Rx-timer is arranged such that after having received the offset value Rx-timer is arranged to:
- initiate a data start signal informing the frequency hopping communication system that valid data now can be received, and
- send a symbol clock signal to the symbol detector to define a sample position of a symbol.

23. A frequency hopping communication system, comprising:
- a synchronization unit arranged for synchronization of transmitted and received signals in frequency hopping communication systems where data is arranged to be transmitted in frames comprising a preamble and a data block, the frequency hopping communication system, the synchronization unit comprising
- a transmitter,
- a receiver, and
- two PN-generators, one located at a transmitting end and one located at a receiving end, both PN-generators arranged to generate a same predefined frequency pattern causing the transmitter and the receiver to hop in frequency according to the same pattern, the receiver and the PN-generator at the receiving end being part also of the synchronization unit, wherein a clock rate in the receiver is arranged to be slowed down compared to a clock rate of the transmitter, thus causing a characteristic pattern and a reversed characteristic pattern, wherein the characteristic pattern and the reversed characteristic pattern result from interference between the predefined frequency pattern of the transmitted signal and the slowed down predefined frequency pattern used in the receiver, the slowed down predefined frequency pattern arranged to be controlled by a slower clock rate in the receiver and to be used in the receiver during synchronization, the time elapsed from start of synchronization represented by a starting point, the synchronization being arranged to be initiated by a start sync signal, until obtaining the characteristic pattern and the reversed characteristic pattern being a measure of the delay between the transmitted and received signal which is used to synchronize the receiver to the transmitted signals, wherein the predefined frequency pattern of the transmitted signal is arranged to be received in the receiver with a first delay proportional to a distance between the receiver and transmitter, wherein the characteristic pattern is arranged to start at a synchronization point in the interference pattern at a time tc after a second delay, and wherein a Vernier scale effect causes the second delay, the second delay being a measure of the delay between the transmitted and received signal, to be magnified compared to the first delay.

* * * * *